United States Patent
Liu et al.

(10) Patent No.: US 9,449,447 B2
(45) Date of Patent: Sep. 20, 2016

(54) CONTROL SYSTEM AND CONTROL METHOD FOR VEHICLE ANTI-THEFT

(71) Applicant: HON HAI PRECISION INDUSTRY CO., LTD., New Taipei (TW)

(72) Inventors: Po-Hsien Liu, New Taipei (TW); Yu-Wen Chen, New Taipei (TW)

(73) Assignee: HON HAU PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/725,688

(22) Filed: May 29, 2015

(65) Prior Publication Data

US 2016/0071344 A1    Mar. 10, 2016

(30) Foreign Application Priority Data

Sep. 10, 2014  (TW) .............................. 103131243 A

(51) Int. Cl.
*G07C 9/00* (2006.01)
*B60R 25/20* (2013.01)

(52) U.S. Cl.
CPC .......... *G07C 9/00309* (2013.01); *B60R 25/20* (2013.01); *G07C 9/00571* (2013.01)

(58) Field of Classification Search
CPC .... G08G 1/207; B60R 25/04; B60R 25/252; B60R 25/255; B60R 25/24; B60R 25/20; G07C 9/00309; G07C 9/00817; G07C 9/00571; G07C 9/00111; G07C 2009/00293

USPC ....... 340/5.61, 5.6, 5.23, 5.72, 5.22, 426.14, 340/426.36
See application file for complete search history.

(56) References Cited

U.S. PATENT DOCUMENTS

| | | | |
|---|---|---|---|
| 7,916,005 B2* | 3/2011 | Nakane | B60R 25/04 307/10.2 |
| 7,949,541 B2* | 5/2011 | McGinn | G06Q 10/00 340/5.8 |
| 8,514,053 B2* | 8/2013 | Ito | B60R 25/24 307/10.5 |
| 2016/0078700 A1* | 3/2016 | Yeh | G07C 9/00111 340/5.61 |

* cited by examiner

*Primary Examiner* — Ali Neyzari
(74) *Attorney, Agent, or Firm* — Zhigang Ma

(57) ABSTRACT

A control method for anti-theft is provided. The method is running to a vehicle. The control method includes: allocating a calculation factor dynamically; calculating a high-frequency compensation value according to the calculation factor; adding the high-frequency compensation value to a frequency value of the high-frequency signal to obtain a first frequency value of the high-frequency signal; switching a high-frequency receive unit to a new channel being able to receive a high-frequency signal having a frequency value that is equal to the first frequency value of the high-frequency signal; receiving a high-frequency signal when a frequency value of the high-frequency signal is equal to the first frequency value of the high-frequency signal; and unlocking the vehicle according to the high-frequency signal.

8 Claims, 4 Drawing Sheets

CONTROL SYSTEM AND CONTROL METHOD FOR VEHICLE ANTI-THEFT

FIELD

The subject matter herein generally relates to control systems and control methods for vehicle anti-theft.

BACKGROUND

PKES (Passive Keyless Entry System) refers to a communication between a vehicle and a smart key via the vehicle transmitting the low-frequency signals and the smart key returning the high-frequency signals after receiving the low frequency signals so as to achieve to open the door. However, PKES is easy to be relay attack.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
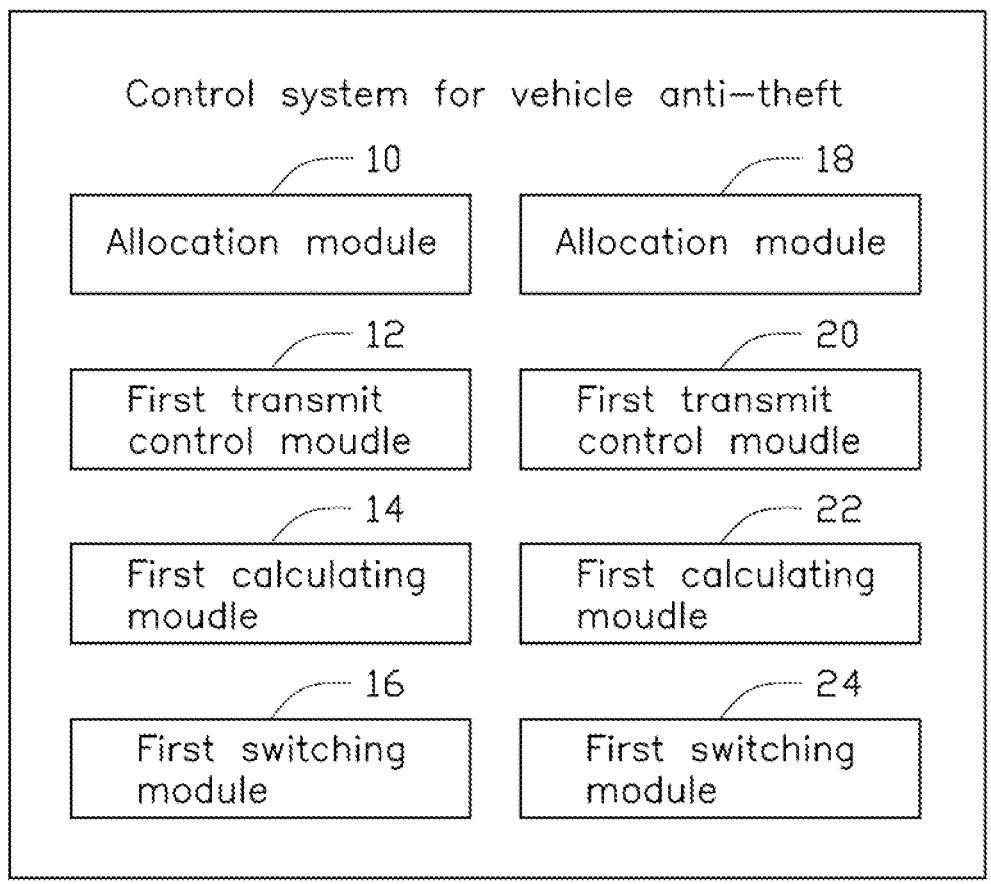
FIG. 1 is a block diagram of an embodiment of a control system for vehicle anti-theft.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

Figure 2:
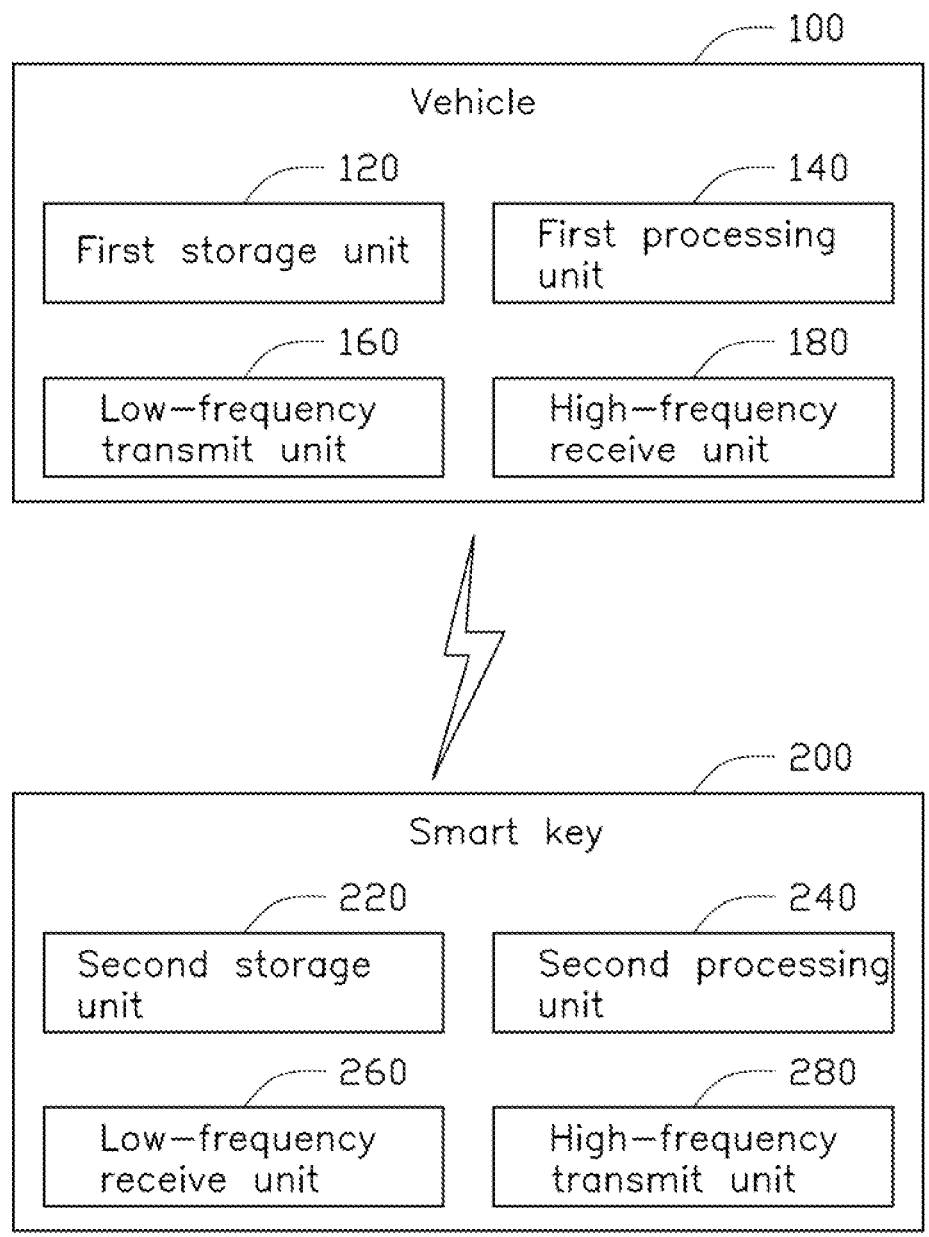
FIG. 2 is a block diagram of an embodiment of an operating environment of a control system for vehicle anti-theft shown in FIG. 1.

FIG. 1 shows a control system for vehicle anti-theft 1. The control system for vehicle anti-theft 1 can be run in but not limited to a vehicle 100 and a smart key 200 which are shown on FIG. 2.

The vehicle 100 can include a first storage unit 120, a first processing unit 140, a low-frequency transmit unit 160 and a high-frequency receive unit 180.

The first storage unit 120 can store a first frequency value of the low-frequency signal and a first frequency value of the high-frequency signal.

The smart key 200 can include a second storage unit 220, a second processing unit 240, a low-frequency receive unit 260 and a high-frequency transmit unit 280.

The second storage unit 220 can store a second frequency value of the low-frequency signal and a second frequency value of the high-frequency signal. The second frequency value of the low-frequency signal is equal to the first frequency value of the low-frequency signal. The second frequency value of the high-frequency signal is equal to the first frequency value of the high-frequency signal.

In at least one embodiment, the first storage unit 120 and the second storage unit 220 can be an internal storage system, such as a flash memory, a random access memory (RAM) for temporary storage of information, and/or a read-memory (ROM) for permanent storage of information.

In at least one embodiment, the first storage unit 120 and the second storage unit 220 can also be a storage system, such as a hard disk, a storage card, or a data storage medium. The first storage unit 120 and the second storage unit 220 can include volatile and/or non-volatile storage devices.

In at least one embodiment, the first storage unit 120 and the second storage unit 220 can include two or more storage devices such that one storage device is a memory and the other storage device is a hard drive. Additionally, the first storage unit 120 and the second storage unit 220 can be respectively located either entirely or partially external relative to the vehicle 100 or the smart key 200.

In at least one embodiment, the first processing unit 140 and the second processing unit 240 can be a central processing unit, a digital signal processor, or a single chip, for example.

Referring to FIG. 1, the control system for vehicle anti-theft 1 can include a number of modules, and the number of modules can include an allocation module 10, a first transmit control module 12, a first calculating module 14, a first switching module 16, an unlocking module 18, a second switching module 20, a second calculating module 22 and a second transmit control module 24. The number of modules can be stored in the first storage unit 120 and/or second storage unit 220, and further applied on the first processing unit 140 and/or second processing unit 240. In this embodiment, the allocation module 10, the first transmit control module 12, the first calculating module 14, the first switching module 16 and the unlocking module 18 can be stored in the first storage unit 120, and applied on the first processing unit 140. The second switching module 20, the second calculating module 22 and the second transmit control module 24 can be stored in the second storage unit 220, and applied on the second processing unit 240. The details are as follows.

The allocation module 10 can be used to allocate a calculation factor dynamically. In at least one embodiment, the calculation factor can be a function having a variable that can be time, or other suitable factor.

The first calculating module 14 can be used to calculate a high-frequency compensation value according to the calculation factor, and further read the first frequency value of the high-frequency signal from the first storage unit 120 of the vehicle 100, and further add the high-frequency compensation value to the first frequency value of the high-frequency signal to obtain a third frequency value of the high-frequency signal.

The first switching module 16 can be used to switch a channel of the high-frequency receive unit 180 to a new channel, therein, the new channel can be able to receive a high-frequency signal having a frequency value that is equal to the third frequency value of the high-frequency signal.

The unlocking module 18 can be used to unlock the vehicle 100 when the high-frequency receive unit 180 receives a high-frequency signal having a frequency value that is equal to the third frequency value of the high-frequency signal.

The first transmit control module 12 can be used to control the low-frequency transmit unit 160 to transmit a low-frequency signal containing the calculation factor.

The second switching module 20 can be used to read the second frequency value of the low-frequency signal from the second storage unit 220 of the smart key 200, and further switch the channel of the low-frequency receive unit 260 to a new channel, therein, the new channel can be able to receive a low-frequency signal having a frequency value that is equal to the second frequency value of the low-frequency signal.

When the channel of the low-frequency receive unit 260 has been switched to the new channel, the low-frequency receive unit 260 can be able to receive a low-frequency signal having a frequency value that is equal to the second frequency value of the low-frequency signal when the smart key 200 is within a predefined distance of the vehicle 100.

After receiving the low-frequency signal, the second calculating module 22 can be used to read the calculation factor from the low-frequency signal, and further calculate a high-frequency compensation value according to the calculation factor, and further read a second frequency value of the high-frequency signal from the second storage unit 220 of the smart key 200, and further add the high-frequency compensation value to the second frequency value of the high-frequency signal to obtain a fourth frequency value of the high-frequency signal.

The second transmit control module 24 can be used to transmit a high-frequency signal having a frequency value that is equal to the fourth frequency value of the high-frequency signal.

If the fourth frequency value of the high-frequency signal is equal to the third frequency value of the high-frequency signal, when the vehicle 100 is within a predefined distance of the smart key 200, the high-frequency receive unit 180 can be used to receive the high-frequency signal transmitted from the high-frequency transmit unit 24.

The unlocking module 18 can be used to unlock the vehicle 100 after the high-frequency receive unit 180 receives the high-frequency signal.

Figure 3:
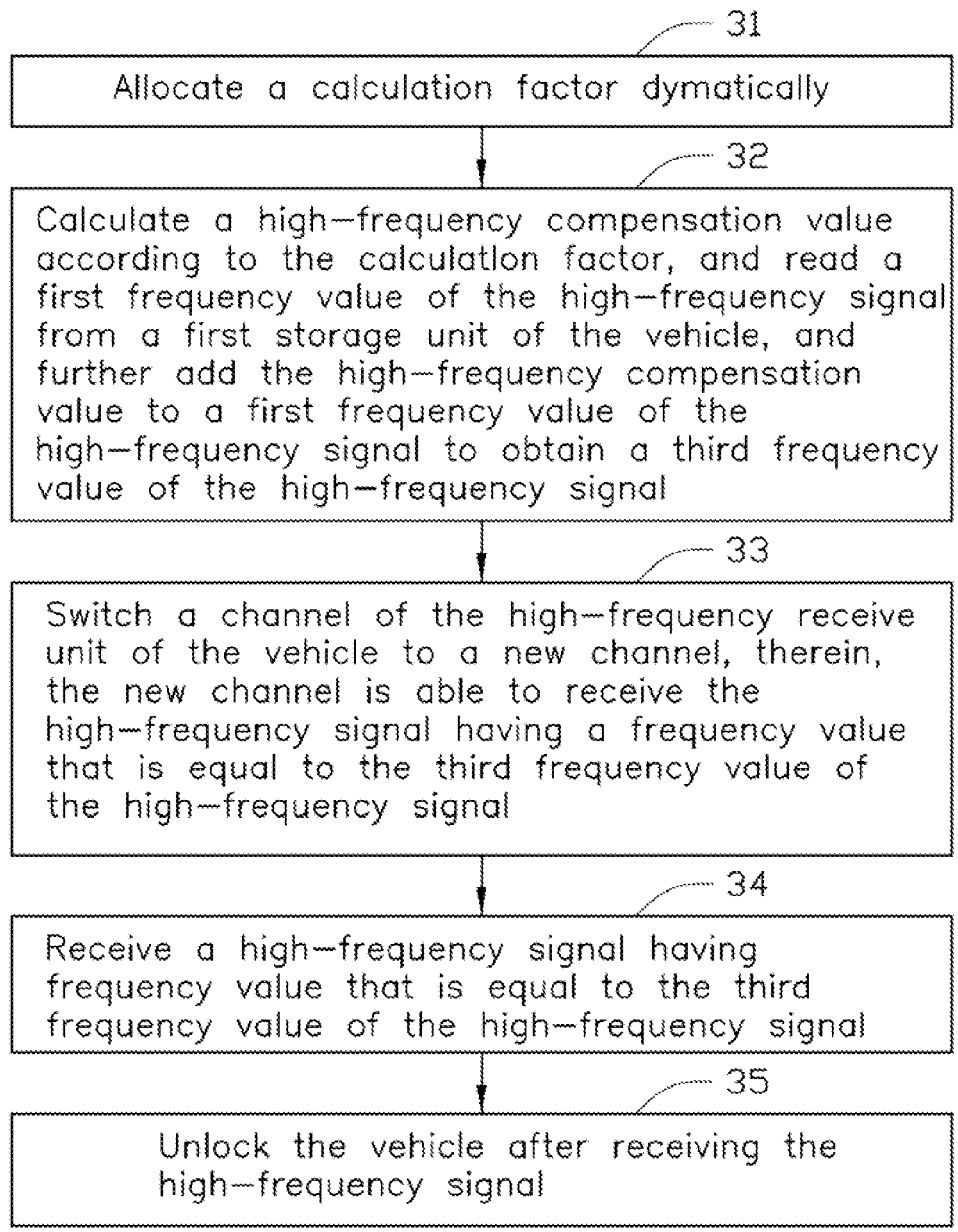
FIG. 3 is a flowchart of an embodiment of a control method for vehicle anti-theft.

FIG. 3 illustrates a flowchart of a control method for a vehicle anti-theft. The control method is provided by way of example, as there are a variety of ways to carry out the method. The control method described below can be carried out using the configurations illustrated in FIG. 1, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 31.

At block 31, an allocation module allocates a calculation factor dynamically.

At block 32, a first calculating module calculates a high-frequency compensation value according to the calculation factor, and further reads a first frequency value of the high-frequency signal from a first storage unit of a vehicle, and further adds the high-frequency compensation value to the first frequency value of the high-frequency signal to obtain a third frequency value of the high-frequency signal.

At block 33, a first switching module switches a channel of the high-frequency receive unit of the vehicle to a new channel, therein, the new channel can be able to receive the high-frequency signal having a frequency value that is equal to the third frequency value of the high-frequency signal.

At block 34, when the vehicle is within a predefined distance of a smart key, a high-frequency receive unit of the vehicle is able to receive a high-frequency signal having a frequency value that is equal to the third frequency value of the high-frequency signal transmitted form the smart key.

At block 35, an unlocking module unlocks the vehicle in response of receiving the high-frequency signal.

Figure 4:
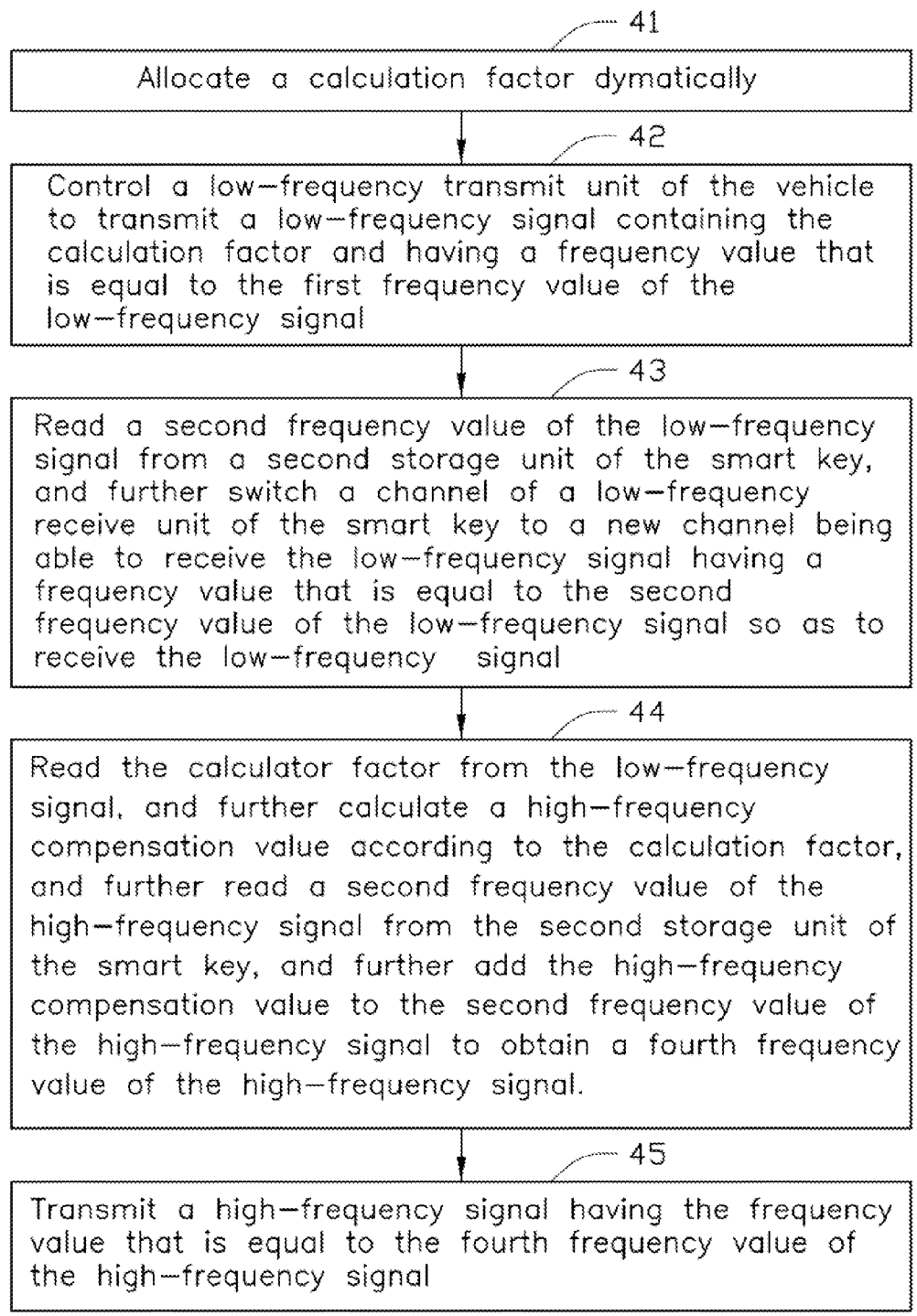
FIG. 4 is a flowchart of an embodiment of a control method for smart key.

FIG. 4 illustrates a flowchart of a control method for a smart key. The control method is provided by way of example, as there are a variety of ways to carry out the method. The control method described below can be carried out using the configurations illustrated in FIG. 1, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 41.

At block 41, an allocation module allocates a calculation factor dynamically.

At block 42, a first transmit control module controls a low-frequency transmit unit of a vehicle to transmit a low-frequency signal containing the calculation factor having a frequency value that is equal to the first frequency value of the low-frequency signal.

At block 43, a second switching module reads a second frequency value of the low-frequency signal from a second storage unit of a smart key, and further switches a channel of a low-frequency receive unit of the smart key to a new channel which can be able to receive the low-frequency signal having a frequency value that is equal to the second frequency value of the low-frequency signal, therefore, as long as the smart key is within a predefined distance of the vehicle, the low-frequency receive unit of the smart key is able to receive the low-frequency signal having a frequency value that is equal to the second frequency value of the low-frequency signal.

At block 44, after the low-frequency receive unit receiving the low-frequency signal, a second calculating module reads the calculation factor from the low-frequency signal, and further calculates a high-frequency compensation value according to the calculation factor, and further reads a second frequency value of the high-frequency signal from the second storage unit of the smart key, and further adds of the high-frequency compensation value to the second frequency value of the high-frequency signal to obtain a fourth frequency value of the high-frequency signal.

At block 45, a second transmit control module transmits a high-frequency signal having a frequency value that is equal to the fourth frequency value of the high-frequency signal.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A control system for anti-theft, running on a vehicle and a smart key, the control system comprising:
   a plurality of processing units; and
   a plurality of modules coupled to the plurality of processing units, each of the plurality of modules including instructions to be executed by one or more of the plurality of processing units, the plurality of modules comprising:
   an allocation module configured to, upon execution by a processing unit of the vehicle, cause the processing unit of the vehicle to allocate a calculation factor dynamically;
   a first calculating module configured to, upon execution by the processing unit of the vehicle, cause the processing unit of the vehicle to calculate a high-frequency compensation value according to the calculation factor and add the high-frequency compensation value to a first frequency value of the high-frequency signal stored in a first storage unit of the vehicle to obtain a third frequency value of the high-frequency signal;
   a first switching module configured to, upon execution by the processing unit of the vehicle, cause the processing unit of the vehicle to switch a high-frequency receive unit of the vehicle to a new channel being able to receive a high-frequency signal having a frequency value that is equal to the third frequency value of the high-frequency signal;
   a first transmit control module configured to, upon execution by the processing unit of the vehicle, cause the processing unit of the vehicle to control a low-frequency transmit unit to transmit a low-frequency signal containing the calculation factor, wherein a low-frequency receive unit of the smart key is configured to receive the low-frequency signal;
   a second calculating module configured to, upon execution by a processing unit of the smart key, cause the processing unit of the smart key to read the calculation factor from the low-frequency signal, calculate a high-frequency compensation value according to the calculation factor, and add the high-frequency compensation value to a second frequency value of the high-frequency signal stored in a second storage unit of the smart key to obtain a fourth frequency value of the high-frequency signal;
   a second transmit control module configured to, upon execution by the processing unit of the smart key, cause the processing unit of the smart key to control a high-frequency transmit unit of the smart key to transmit a high-frequency signal having a frequency value that is equal to the fourth frequency value of the high-frequency signal, if the fourth frequency value of the high-frequency signal is equal to the third frequency value of the high-frequency signal, the high-frequency receive unit of the vehicle is configured to receive the high-frequency signal; and
   an unlocking module configured to, upon execution by the processing unit of the vehicle, cause the processing unit of the vehicle to unlock the vehicle according to the high-frequency signal.

2. The control system of claim 1, wherein if the fourth frequency value of the high-frequency signal is not equal to the third frequency value of the high-frequency signal, the high-frequency receive unit does not receive the high-frequency signal, and the unlocking module is further configured to not unlock the vehicle when the high-frequency receive unit receives no high-frequency signal.

3. The control system of claim 1, wherein the plurality of modules comprises:
   a second switching module configured to, upon execution by the processing unit of the smart key, cause the processing unit of the smart key to switch the low-frequency receive unit of the smart key to a new channel being able to receive the low-frequency signal.

4. A control method for anti-theft, running on a vehicle and a smart key, the control method comprising:
   allocating a calculation factor dynamically;
   calculating a high-frequency compensation value according to the calculation factor and adding the high-frequency compensation value to a first frequency value of a high-frequency signal stored in a first storage unit of the vehicle to obtain a third frequency value of the high-frequency signal;
   switching a high-frequency receive unit of the vehicle to a new channel being able to receive a high-frequency signal having a frequency value that is equal to the third frequency value of the high-frequency signal;
   controlling a low-frequency transmit unit to transmit a low-frequency signal containing the calculation factor;
   the smart key receiving the low-frequency signal;
   reading the calculation factor from the low-frequency signal, calculating the high-frequency compensation value according to the calculation factor, and adding the high-frequency compensation value to a second frequency value of the high-frequency signal stored in a second storage unit of the smart key to obtain a fourth frequency value of the high-frequency signal;
   controlling the high-frequency transmit unit of the smart key to transmit a high-frequency signal having a frequency value that is equal to the fourth frequency value of the high-frequency signal, determining whether the fourth frequency value of the high-frequency signal is equal to the third frequency value of the high-frequency signal
   receiving the high-frequency signal when the fourth frequency value of the high-frequency signal is equal to the third frequency value of the high-frequency signal, a high-frequency receive unit of the vehicle receives the high-frequency signal; and
   unlocking the vehicle according to the high-frequency signal.

5. The control method of claim 4, wherein the control method further comprises:
   not receiving the high-frequency signal when the fourth frequency value of the high-frequency signal is not equal to the third frequency value of the high-frequency signal; and
   not unlocking the vehicle when receiving no high-frequency signal.

6. The control method of claim 4, wherein the control method further comprises:
   switching a low-frequency receive unit of the smart key to a new channel being able to receive the low-frequency signal.

7. A control method for anti-theft, running on a vehicle, the control method comprising:
- allocating a calculation factor dynamically;
- calculating a high-frequency compensation value according to the calculation factor, and further adding the high-frequency compensation value to a frequency value of a high-frequency signal stored in a storage unit of the vehicle to obtain a first frequency value of the high-frequency signal;
- switching a high-frequency receive unit of the vehicle to a new channel being able to receive a high-frequency signal having a frequency value that is equal to the first frequency value of the high-frequency signal;
- the high-frequency receive unit of the vehicle receiving a high-frequency signal when a frequency value of the high-frequency signal is equal to the first frequency value of the high-frequency signal; and
- unlocking the vehicle according to the high-frequency signal.

8. The control method of claim 7, wherein the control method further comprises:
- the high-frequency receive unit of the vehicle not receiving the high-frequency signal when the frequency value of the high-frequency signal is not equal to the first frequency value of the high-frequency signal; and
- not unlocking the vehicle when the high-frequency receive unit receives no high-frequency signal.

* * * * *